United States Patent
Taylor

(10) Patent No.: US 6,617,552 B1
(45) Date of Patent: Sep. 9, 2003

(54) SYSTEM AND METHOD FOR WARMING PREMATURE INFANT FEEDINGS

(75) Inventor: Randall Wade Taylor, No. 4 Bobcat Trail, Conway, AR (US) 72032

(73) Assignee: Randall Wade Taylor, Conway, AR (US)

(*) Notice: Subject to any disclaimer, the term of this patent is extended or adjusted under 35 U.S.C. 154(b) by 0 days.

(21) Appl. No.: 10/317,800

(22) Filed: Dec. 12, 2002

Related U.S. Application Data

(60) Provisional application No. 60/411,188, filed on Sep. 16, 2002.

(51) Int. Cl.[7] ............................ A47J 39/02; A47J 36/26
(52) U.S. Cl. ...................... 219/400; 219/428; 219/386; 222/146.5
(58) Field of Search .................................. 219/400, 428, 219/385, 386, 429, 430, 332, 333; 222/146.5

(56) References Cited

U.S. PATENT DOCUMENTS

| | | | |
|---|---|---|---|
| 944,307 A | * | 12/1909 | Bauer |
| 2,551,651 A | * | 5/1951 | Vandewater |
| 3,804,076 A | * | 4/1974 | Fant et al. |
| 4,163,471 A | * | 8/1979 | Leder |
| 4,376,096 A | * | 3/1983 | Bowen |
| 5,248,870 A | * | 9/1993 | Redal |
| 5,318,107 A | * | 6/1994 | Bell |
| 5,797,313 A | * | 8/1998 | Rothley |
| 5,975,337 A | * | 11/1999 | Hadley |
| 6,123,065 A | * | 9/2000 | Teglbjarg |
| 6,234,165 B1 | * | 5/2001 | Creighton et al. |
| 6,294,762 B1 | * | 9/2001 | Faries, Jr. et al. ........... 219/400 |
| 6,417,498 B1 | * | 7/2002 | Shields et al. |

FOREIGN PATENT DOCUMENTS

| | | | |
|---|---|---|---|
| DE | 3010889 | * | 9/1981 |
| DE | 3110060 | * | 11/1982 |

* cited by examiner

*Primary Examiner*—Joseph Pelham
(74) *Attorney, Agent, or Firm*—Baker Botts L.L.P.

(57) ABSTRACT

According to one embodiment of the invention, a system for warming infant feedings includes a housing having a lower chamber, a middle chamber, and an upper chamber, a plurality of apertures associated with a first partition separating the lower chamber from the middle chamber, and a plurality of portals associated with a second partition separating the upper chamber from the middle chamber. Each portal is positioned above a respective aperture and adapted to position an infant feeding over the respective aperture. A false feeding is coupled to an underside of the second partition and disposed above a respective aperture and a surface heat sensor probe is coupled to the false feeding. The surface heat sensor probe is operable to detect a temperature of the false feeding, and a heating unit is coupled to the heat sensor probe. The heating unit includes a fan operable to continuously circulate air through the lower chamber and into the middle chamber. The heating unit further including a thermostat and a heating element, in which the thermostat is operable to control an energy output of the heating element to heat the continuously circulated air and, in conjunction with the surface heat sensor probe, to maintain the temperature of false feeding at a predetermined temperature.

30 Claims, 5 Drawing Sheets

FIG. 4

SYSTEM AND METHOD FOR WARMING PREMATURE INFANT FEEDINGS

RELATED APPLICATIONS

This application claims the priority under 35 U.S.C. §119 of provisional application No. 60/411,168 filed Sep. 16, 2002.

TECHNICAL FIELD OF THE INVENTION

The present invention relates generally to the field of pediatrics and, more particularly, to a system and method for warming premature infant feedings.

BACKGROUND OF THE INVENTION

Infants are sometimes born prematurely. Since "premies" are not carried full term they are not fully developed and, hence, need to be looked after with great care. Premies are typically placed in a Neonatal Intensive Care Unit ("NICU") after being born so that nurses may pay close attention to them to ensure that they are nurtured in the correct manner. One of the most important things for a premie is weight gain. The faster they can put on weight, the better. This is why NICU nurses feed the premies milk on a scheduled basis.

The preference is to feed a premie fresh breast milk from the mother because of the perceived advantages of breast milk. There is hope that the immunologic advantages of breast milk will benefit in reducing some disease processes in very premature infants. However, it is not always possible to feed premies fresh breast milk. Accordingly, breast milk has to be either refrigerated or frozen and then warmed at a later time.

Warming premature infant feedings (breast milk or otherwise) to the correct temperature is important for the health of the premie. Ensuring the integrity of the immunoglobulins and keeping the nutritional components and vitamins found in breast milk intact are just a few reasons why the temperature of the breast milk needs to be controlled with accuracy. Currently, precisely warming premature infant feedings to the correct temperature is a problem in NICU's. Some simply use hot water, waxes and oils to heat the feedings. For example, U.S. Pat. No. 6,417,498 to Shields et al., discloses the use of water, organic fluids, gel, and the like to heat infant feedings; however, there are contamination problems to consider when using such media. Warm fluids tend to harbor and promote bacterial growth, thus allowing for bacterial colonization and contamination. Some NICU's use infant care warmers, such as an isolette, to heat the feedings. However, this is not an accurate method and may take a long time to heat the feedings. Other methods, such as open flame heating and glowing mantle heating are impractical for use in a hospital environment where oxygen is in use.

SUMMARY OF THE INVENTION

According to one embodiment of the invention, a system for warming infant feedings includes a housing having a lower chamber, a middle chamber, and an upper chamber, a plurality of apertures associated with a first partition separating the lower chamber from the middle chamber, and a plurality of portals associated with a second partition separating the upper chamber from the middle chamber. Each portal is positioned above a respective aperture and adapted to position an infant feeding over the respective aperture. A false feeding is coupled to an underside of the second partition and disposed above a respective aperture and a surface heat sensor probe is coupled to the false feeding. The surface heat sensor probe is operable to detect a temperature of the false feeding, and a heating unit is coupled to the heat sensor probe. The heating unit includes a fan operable to continuously circulate air through the lower chamber and into the middle chamber. The heating unit further including a thermostat and a heating element, in which the thermostat is operable to control an energy output of the heating element to heat the continuously circulated air and, in conjunction with the surface heat sensor probe, to maintain the temperature of false feeding at a predetermined temperature.

Embodiments of the invention provide a number of technical advantages. Embodiments of the invention may include all, some, or none of these advantages. An infant feeding warmer according to one embodiment of the invention is easy to use and clean and can warm multiple feedings to the correct temperature in a short amount of time. One technical advantage of precisely warming premature infant feedings to the correct temperature is improved health and rapid weight gain for the premie. The integrity of the immunoglobulins, nutritional components, and vitamins found in breast milk may be kept intact. In addition, any undue stress on the premature infant due to any temperature difference between the feeding and the body of the premature infant may be avoided. Feeding a premature infant breast milk at the correct temperature may also decrease the diagnosis of reflux and the problems associated with reflux, such as the use of medications to treat reflux. Another additional advantage is that a premature infant may be able to spend less time in the NICU and/or hospital, which saves expense and stress on the parents.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EXAMPLE EMBODIMENTS OF THE INVENTION

Example embodiments of the present invention and their advantages are best understood by referring now to FIGS. 1–6 of the drawings, in which like numerals refer to like parts.

Figure 1:
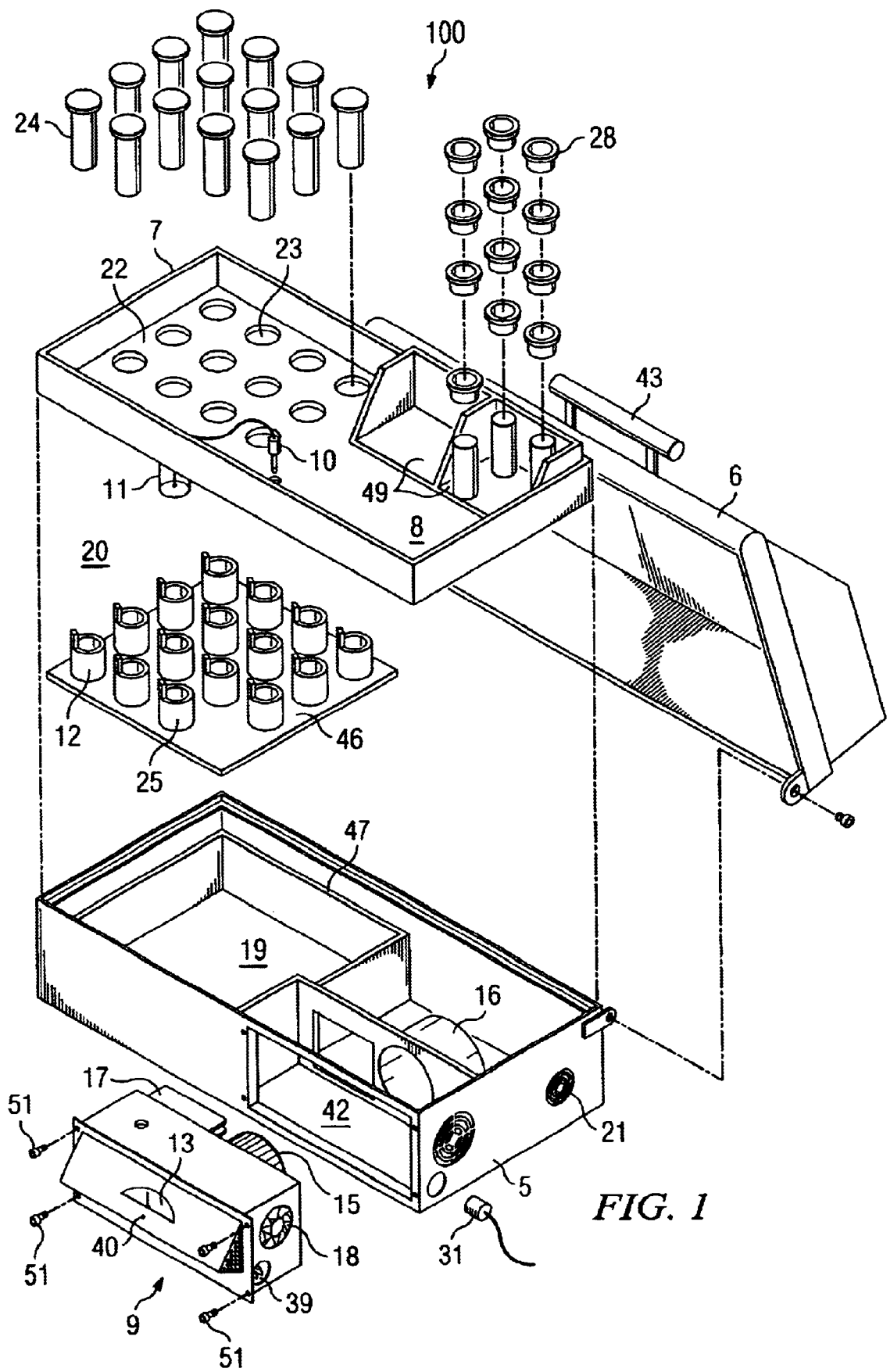
FIG. 1 is an exploded view, in perspective, of an infant feeding warmer in accordance with one embodiment of the present invention.

FIG. 1 is an exploded view, in perspective, of an infant feeding warmer 100 in accordance with one embodiment of the present invention. Although infant feeding warmer 100 may be used to warm any suitable liquid for any suitable purpose, infant feeding warmer 100 is particularly advantageous for warming feedings for premature infants. As used throughout this description, a "feeding" refers to an amount of breast milk or other liquid suitable for feeding infants that is housed in any suitable container, such as a syringe, a 60 cc Vol-feeder, a vial, a tube, a bottle, or any other suitable container that is able to hold an amount of liquid. One of the most important considerations for a premature infant is rapid weight gain. One way to put weight on a premature infant rapidly is to feed the premature infant breast milk from the mother at the correct temperature. Breast milk is thought to be preferred over other types of milk and/or liquid because of the immunoglobulins, nutritional components and vitamins found therein. It is important that these alleged benefits of breast milk stay intact; this is one reason why overheating of breast milk should be avoided. Feeding a premature infant breast milk at the correct temperature also avoids any undue stress on the infant that may be present as a result of the temperature difference between the feeding and the body of the premature infant. Other reasons exist for feeding a premature infant breast milk at the correct temperature. Infant feeding warmer 100, according to the teachings of the present invention, has the ability to heat multiple infant feedings to the correct temperature in a short amount of time. Generally, infant feeding warmer 100 facilitates this by continuously recirculating heated air through individual feeding receptacles and ensuring that the feedings contained within the feeding receptacles are not overheated.

In the illustrated embodiment, infant feeding warmer 100 includes a housing 5 having a lower chamber 19, a middle chamber 20, an upper chamber 8, a fan housing 16, and a motor housing 42. A cover 6 encloses housing 5. Infant feeding warmer 100 further includes a plurality of feeding receptacles 12, including at least one false feeding receptacle 25, disposed within middle chamber 20, a plurality of portals 23 positioned above respective feeding receptacles 12, a false feeding 11 disposed within false feeding receptacle 25, a surface heat sensor probe 10 coupled to false feeding 11, and a heating unit 9 disposed within motor housing 42. Infant feeding warmer 100 may also include a plurality of air restrictor plugs 24 and a plurality of adapter rings 28. Infant feeding warmer 100 may include different elements or a greater or lesser number of elements than those illustrated in FIG. 1.

Figure 2:
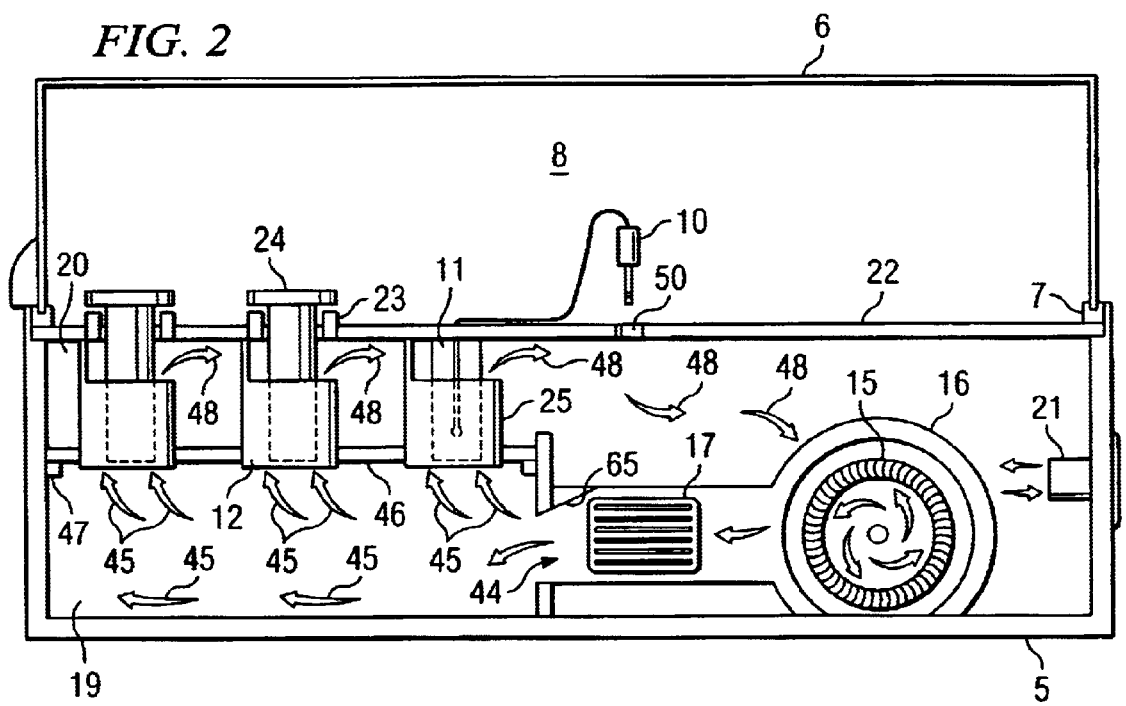
FIG. 2 is a cross-sectional elevation view of the infant feeding warmer of FIG. 1 illustrating the general flow of air.

FIG. 2 is a cross-sectional view of infant feeding warmer 100 illustrating the general flow of air during operation of infant feeding warmer 100. Referring to both FIGS. 1 and 2, housing 5 and cover 6 comprise the "outer shell" of infant feeding warmer 100. Infant feeding warmer 100 may be any suitable size and shape; however, in the illustrated embodiment, infant feeding warmer 100 is generally rectangular in shape and has a size of approximately 1½ feet deep×3 feet long ×1¼ foot high. Housing 5 and cover 6 may be formed from any suitable material. Because infant feeding warmer 100 is, in one embodiment, used to heat infant feedings to a temperature near 100 degrees Fahrenheit, housing 5 should either be formed from a poor heat conducting material or, preferably, housing 5 should have an insulative material coupled thereto. This insulated material is used to ensure correct operation of infant feeding warmer 100 in addition to safety reasons. Any suitable insulated material may be utilized. Cover 6 may be coupled to housing 5 in any suitable manner; however, in one embodiment, cover 6 is hinged to housing 5. Cover 6 may also have a handle 43 associated therewith for opening and closing cover 6 and facilitating access to upper chamber 8. A gasket 7 may also be disposed between and around the perimeters of housing 5 and cover 6 for the purpose of minimizing heat loss from upper chamber 8. If utilized, gasket 7 may be formed from any suitable material.

Lower chamber 19 is any suitably-sized chamber that accepts air being circulated by heating unit 9 through an opening 44 so that lower chamber 19 may distribute the air to feeding receptacles 12 for the purpose of heating infant feedings. The general flow of air in lower chamber 19 is shown by arrows 45 in FIG. 2. As denoted by arrows 48, the air flows through feeding receptacles 12 and false feeding receptacle 25 and into middle chamber 20. Middle chamber 20 is disposed above lower chamber 19 and is separated from lower chamber 19 by a partition 46. Partition 46 may be coupled to housing 5 in any suitable manner; however, in one embodiment, partition 46 is coupled to, or is engaged with, a ledge 47 within lower chamber 19. As denoted by arrows 48, air flows from middle chamber 20 back to fan housing 16 so that it may be recirculated. An air vent 21 may be associated with middle chamber 20 and coupled to housing 5 in any suitable manner. Air vent 21 is utilized because of the warming and cooling effect upon the recirculated air in infant feeding warmer 100. Middle chamber 20 is separated from upper chamber 8 by a partition 22. Partition 22 may be coupled to housing 5 in any suitable manner. Upper chamber 8 is where infant feedings are inserted into feeding receptacles 12. Briefly, cover 6 is opened by handle 43 to access upper chamber 8 and then infant feedings are inserted into feeding receptacles 12 via portals 23. This is described in greater detail below. Upper chamber 8 may also have one or more compartments 49 to store adapter rings 28 or other suitable elements, such as air restrictor plugs 24.

Fan housing 16 functions to house a barrel fan 15 or other suitable fan and a heating element 17 of heating unit 9. Fan housing 16 may be coupled to housing 5 in any suitable manner. During operation, barrel fan 15 or other type of fan within fan housing 16 forces air over heating element 17 and into lower chamber 19. In one embodiment, before the air enters lower chamber 19, the air is deflected downward toward a bottom portion of lower chamber 19 by an angled surface 65 proximate a location where fan housing 16 couples to lower chamber 19. Angled surface 65, which may be any suitable shape and coupled to fan housing 16 in any suitable manner, facilitates better air distribution within lower chamber 19. In another embodiment, an oscillating fan may be used to evenly distribute air within lower chamber 19. The air in lower chamber 19 then enters middle chamber 20 via feeding receptacles 12 before returning back to fan housing 16 for recirculation. Barrel fan 15 and heating element 17 are described in further detail below. Adjacent fan housing 16 is motor housing 42, which is used to house heating unit 9. When heating unit 9 is housed inside motor housing 42 then barrel fan 15 and heating element 17 are then disposed inside fan housing 16.

As described above, feeding receptacles 12 and false feeding receptacle 25 are disposed within middle chamber 20. Feeding receptacles 12 and false feeding receptacle 25 may be disposed within middle chamber 20 in any suitable manner. However, in one embodiment, feeding receptacles 12 and false feeding receptacle 25 are coupled to partition 46 in any suitable manner. Feeding receptacles 12 and false feeding receptacle 25 each have an open bottom exposed to lower chamber 19 and an open top exposed to middle chamber 20 so that air may flow from lower chamber 19 to middle chamber 20. Feeding receptacles 12 and false feeding receptacle 25 may take on any suitable form; however, preferably feeding receptacles 12 and false feeding receptacle 25 are cylindrical. In one embodiment, the open tops are separated from partition 22 by a gap existing between the open tops of feeding receptacles 12 and false feeding receptacle 25 and the bottom of partition 22.

There may be any suitable number of feeding receptacles 12 and they may be arranged in any suitable manner. In addition, false feeding receptacle 25 may be positioned within middle chamber 20 in any suitable position. As implied by their name, feeding receptacles 12 are where infant feedings may be heated. As described in further detail below, main bodies 62 (FIG. 4) of infant feedings are disposed within feeding receptacles 12 so that air flowing therethrough may heat the liquid in main bodies 62 of the infant feedings. Also implied by its name, false feeding receptacle 25 is where a false feeding 11 is disposed therein for the purpose of maintaining the air temperature within middle chamber 20 to a predetermined temperature. False feeding 11 resembles the general shape of a feeding but is not an actual feeding; it is merely an element that is used to emulate an infant feeding for the purpose of maintaining the air temperature within middle chamber 20 to a predetermined temperature. False feeding 11 may be disposed within false feeding receptacle 25 in any suitable manner; however, in one embodiment, false feeding 11 is coupled to an underside of partition 22 in any suitable manner. This operation is described in further detail below.

Surface heat sensor probe 10 is coupled to false feeding 11 for the purpose of detecting a temperature of false feeding 11. Surface heat sensor probe 10 may be coupled to false feeding 11 in any suitable manner. The detected temperature is sent to heating unit 9 for the purpose of maintaining false feeding 11 at a predetermined temperature. In one embodiment, the detected temperature may be transferred to heating unit 9 in any suitable manner. This is described in further detail below. In one embodiment, a wire associated with surface heat sensor probe 10 is disposed along a top side of partition 22 until reaching an aperture 50. The probe part of surface heat sensor probe 10 is then inserted down into aperture 50 and coupled to heating unit 9, as described further below in conjunction with FIGS. 3A and 3B.

Portals 23 are associated with partition 22. Portals 23 may be separate members that are coupled to partition 22 or may be formed integral with partition 22. Each portal 23 is positioned above a respective feeding receptacle 12 and is adapted to position main body 62 (FIG. 4) of an infant feeding within a respective feeding receptacle 12. The use of portals 23 are described in further detail below in conjunction with FIGS. 4 and 5.

With reference to FIG. 1, heating unit 9 is generally used to maintain the temperature of false feeding 11 at a predetermined temperature. Accordingly, in one embodiment, heating unit 9 includes a thermostat 40 that is coupled to heat sensor probe 10 for the purpose of maintaining the temperature of false feeding 11 at the predetermined temperature. Thermostat 40 controls the energy output of heating element 17 to facilitate the maintaining of the temperature of false feeding 11. Heating unit 9 may be disposed within motor housing 42 and coupled to housing 5 in any suitable manner. For example, a plurality of fasteners 51 may be utilized. Heating unit 9 is described in further detail below in conjunction with FIGS. 3A and 3B.

Air restrictor plugs 24 are adapted to be inserted into feeding receptacles 12. Air restrictor plugs 24 are inserted into feeding receptacles 12 when a particular feeding receptacle 12 is not being used to warm an infant feeding. Air restrictor plugs 24 prevent air from escaping middle chamber 20 into upper chamber 8. In addition, air restrictor plugs 24 have a smaller perimeter than the inside perimeter of feeding receptacles 12 to allow a given volume of heated air to circulate from lower chamber 19 to middle chamber 20. This ensures, or at least increases the chance, that an approximately equal amount of heated air flows through each feeding receptacle 12. Air restrictor plugs 24 may be any suitable shape and may be formed from any suitable material.

Adapter rings 28, which are described in greater detail below in conjunction with FIGS. 4 and 5, function to adapt various sized infant feedings to portals 23 so they may be inserted into feeding receptacles 12 without falling down into feeding receptacles 12 and into lower chamber 19.

Figure 3A:
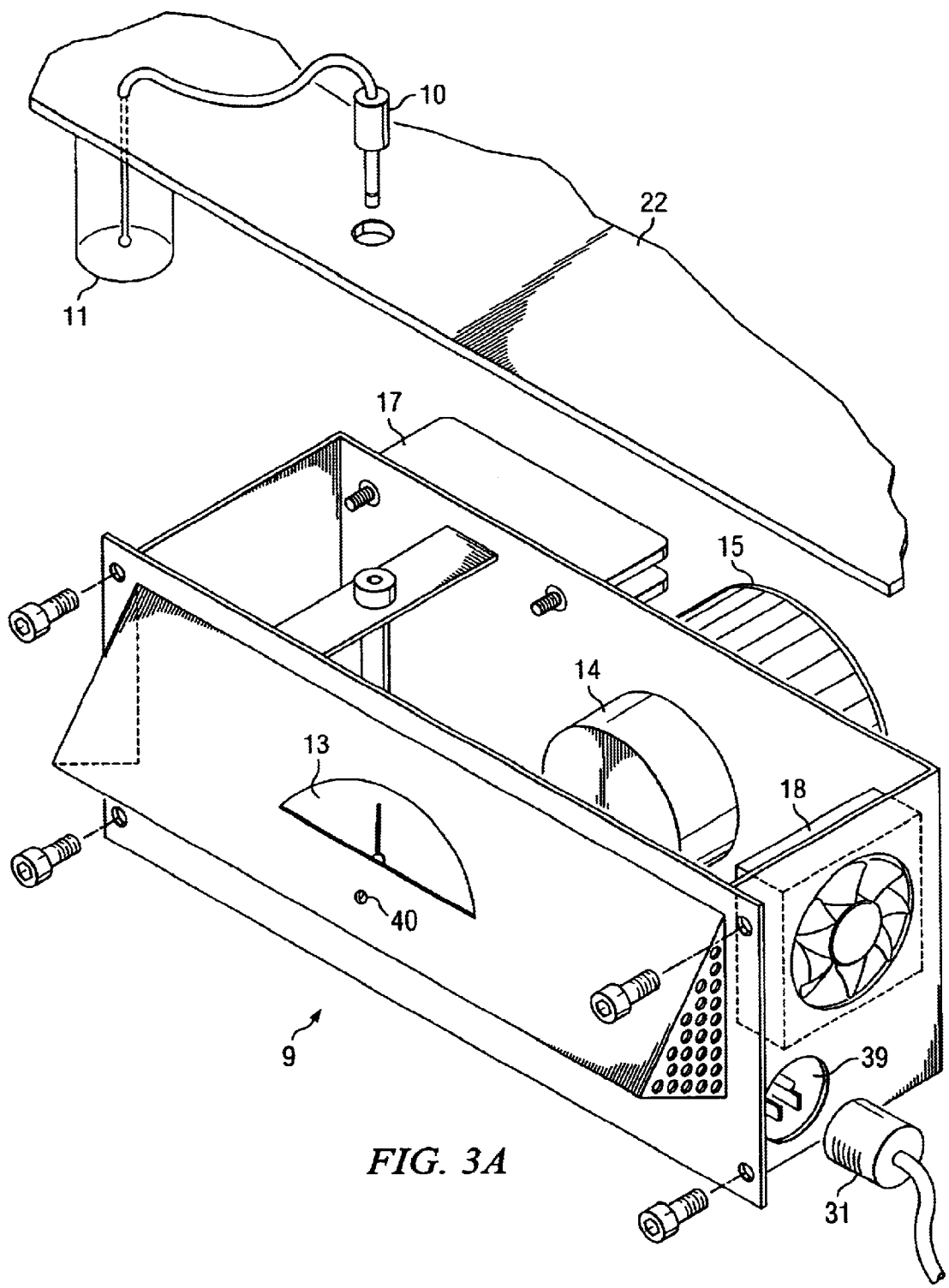
FIG. 3A is a perspective view of a heating unit of the infant feeding warmer of FIG. 1 illustrating a connection of a surface heat sensor probe to the heating unit.

FIG. 3A is a perspective view of heating unit 9 of infant feeding warmer 100 illustrating further details of heating unit 9 and the connection of surface heat sensor probe 10 thereto. In the illustrated embodiment, heating unit 9 includes an electric motor 14, barrel fan 15, heating element 17, thermostat 40, thermostat set point 13, an exhaust fan 18, and a plug-in unit 39.

Electric motor 14 may be any suitable electric motor operable to drive barrel fan 15. Electric motor 14 receives its power via a power cord 31 that is plugged into plug-in unit 39. Electric motor 14 may be coupled to an electric motor housing 56 of heating unit 9 in any suitable manner. Barrel fan 15 may be any suitable fan operable to recirculate air through lower chamber 19, middle chamber 20 and back to fan housing 16 in a continuous manner. In a particular embodiment, barrel fan 15 is a FASCO barrel fan that is 2⅜ inches wide by 3¾ inches diameter. This type of barrel fan is able to force air into lower chamber 19 at a rate of approximately 100150 cubic feet per minute. However, as described above, barrel fan 15 may be any suitably-size fan having any suitable capacity. Barrel fan 15 initially blows air over heating element 17 before it enters lower chamber 19 via opening 44. Heating element 17 may be any suitable heating element that produces energy to heat the air flowing through fan housing 16 before entering lower chamber 19. The energy output of heating element 17 is controlled by thermostat 40.

Thermostat 40, which is electrically coupled to heat sensor probe 10, is operable to control the energy output of heating element 17 in order to maintain the temperature of false feeding 11 at a predetermined temperature. The predetermined temperature is determined by a user of infant feeding warmer 100 using thermostat set point 13. Any suitable predetermined temperature may be utilized. Preferably, the predetermined temperature is the temperature of breast milk that is most beneficial to a particular premature infant. As only one example, the predetermined temperature is 98.6° F.

Figure 3B:
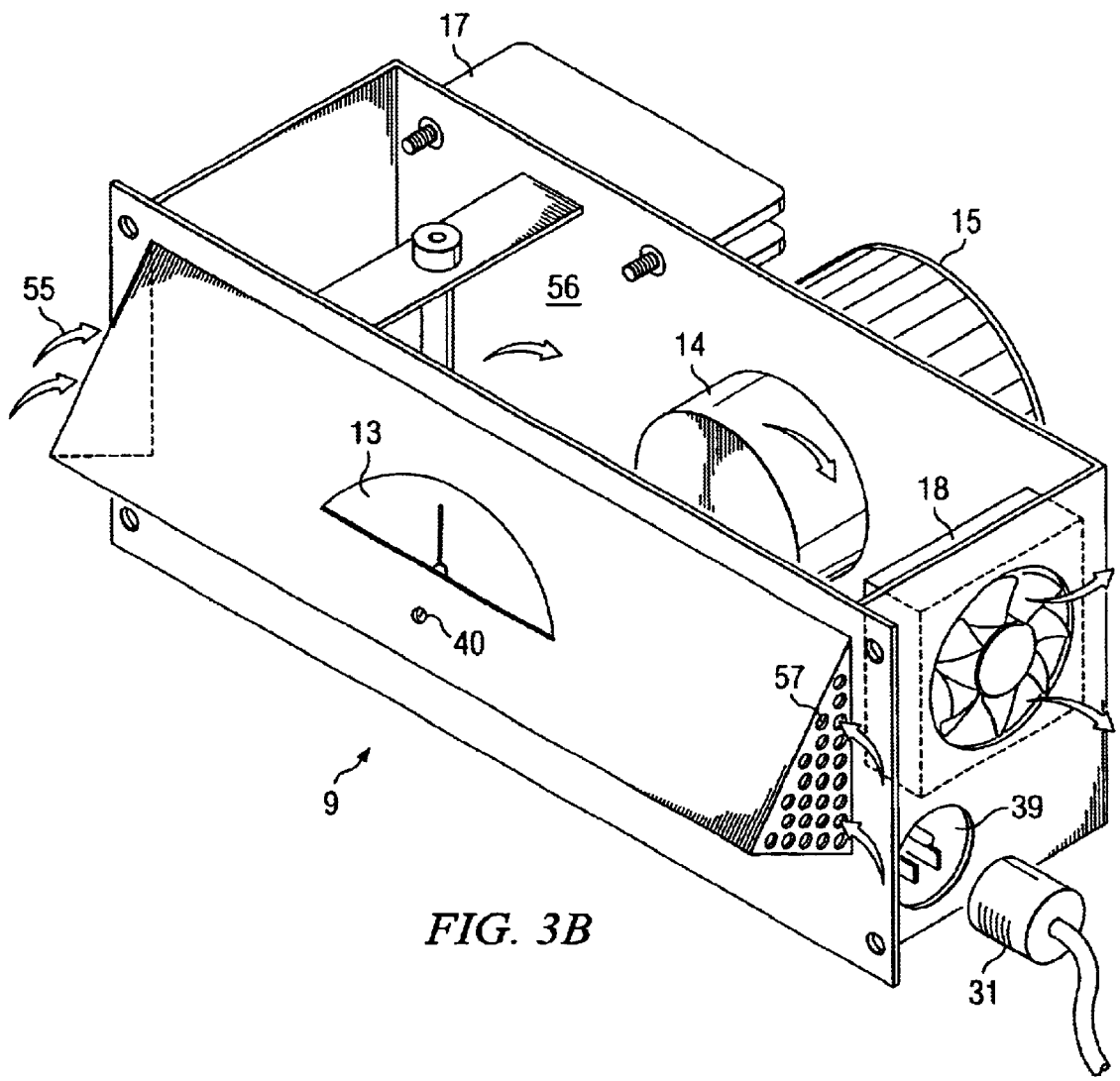
FIG. 3B is a perspective view of the heating unit of the infant feeding warmer of FIG. 1 illustrating the air flow used to cool the electric motor.

Exhaust fan 18 is operable to remove heat from within heating unit 9 generated by electric motor 14. The air flow used to remove heat from within heating unit 9 is illustrated in FIG. 3B. As denoted by arrows 55, ambient air enters electric motor housing 56 and exits out exhaust fan 18 back into the atmosphere. The ambient air may enter electric motor housing 56 in any suitable manner; however, in one embodiment, the air enters a plurality of apertures 57 formed in electric motor housing 56.

In operation of one embodiment of the invention, and with reference to FIGS. 1 and 2, a user of infant feeding warmer 100, such as a neonatal intensive care unit nurse, obtains a clean, sterile, and fully assembled infant feeding warmer 100. Before heating any infant feedings, the user makes sure cover 6 is closed and plugs in power cord 31 into plug-in unit 39 of heating unit 9 to start the recirculation of air through fan housing 16, lower chambers 19, and middle chamber 20 via electric motor 14. The thermostat set point 13 is set to a predetermined temperature, which directs thermostat 40 to increase the energy output of heating element 17 in order to heat the circulating air for the purpose of heating false feeding 11 to the predetermined temperature. Thermostat 40 is able to detect the surface temperature of false feeding 11 via surface heat sensor probe 10. Based on the readings of surface heat sensor probe 10, thermostat 40 controls the energy output of heating element 17 in order to maintain the surface temperature of false feeding 11 at the predetermined temperature.

Once false feeding 11 reaches the predetermined temperature, then one or more infant feedings may be inserted into feeding receptacles 12 for the purpose of heating the infant feedings to the predetermined temperature. Hence, the user opens cover 6 to gain access to upper chamber 8 for the purpose of inserting infant feedings in feeding receptacles 12. Since there were no infant feeding within feeding receptacles while the heating of false feeding 11 was taking place, air restricter plugs 24 are disposed within portals 23 to prevent the heated air from escaping into upper chamber 8 from middle chamber 20. To insert an infant feeding, the user simply removes one air restricter plug from a portal 23 and inserts the infant feeding. The insertion of various infant feedings are described below in conjunction with FIGS. 4 and 5. Once the desired number of infant feedings are inserted in feeding receptacles 12, the user closes cover 6.

Because the infant feedings are at a temperature less than the temperature of false feeding 11, they bring down the temperature of false feeding 11 to a temperature lower than the predetermined temperature. Thermostat 40 senses the drop in the surface temperature of false feeding 11 via heat sensor probe 10 and subsequently increases the energy output of heating element 17 in order to raise the surface temperature of false feeding 11 to the predetermined temperature. Over a certain period of time, an equilibrium is reached in that all infant feedings that were inserted in feeding receptacles 12 are at the same temperature of false feeding 11, which is the predetermined temperature. Preferably, the time period that it takes for an infant feeding to reach the predetermined temperature is no more than one hour. However, other suitable time periods may be associated with the heating of infant feedings using infant feeding warmer 100. In some embodiments, the infant feedings contain frozen breast milk, and since heated air is being used to heat the infant feedings to a temperature in the vicinity of 98.6° F. in a relatively short amount of time without overheating, a high velocity of heated air is typically needed. Hence, for this embodiment, electric motor 14 and barrel fan 15 are sized appropriately in order to obtain the required velocity of heated air.

In one embodiment, thermostat 40 is operable to control the energy output of heating element 17 in order to ensure that the temperature of false feeding 11 does not rise above the predetermined temperature. This prevents any overheating of breast milk, which may prevent the destroying of advantageous immunoglobulins, nutrients, vitamins, or other healthy constituents found in breast milk. It may also prevent any thermal shock to a premature infant based on the temperature difference of the breast milk and the body temperature of the premature infant. Another advantage of using the present invention is that it avoids having to use any liquids or other materials that facilitate bacterial growth during the heating process. It also avoids having to use a flame to heat infant feedings, which could be very dangerous in an NICU where oxygen is in frequent use.

Figure 4:
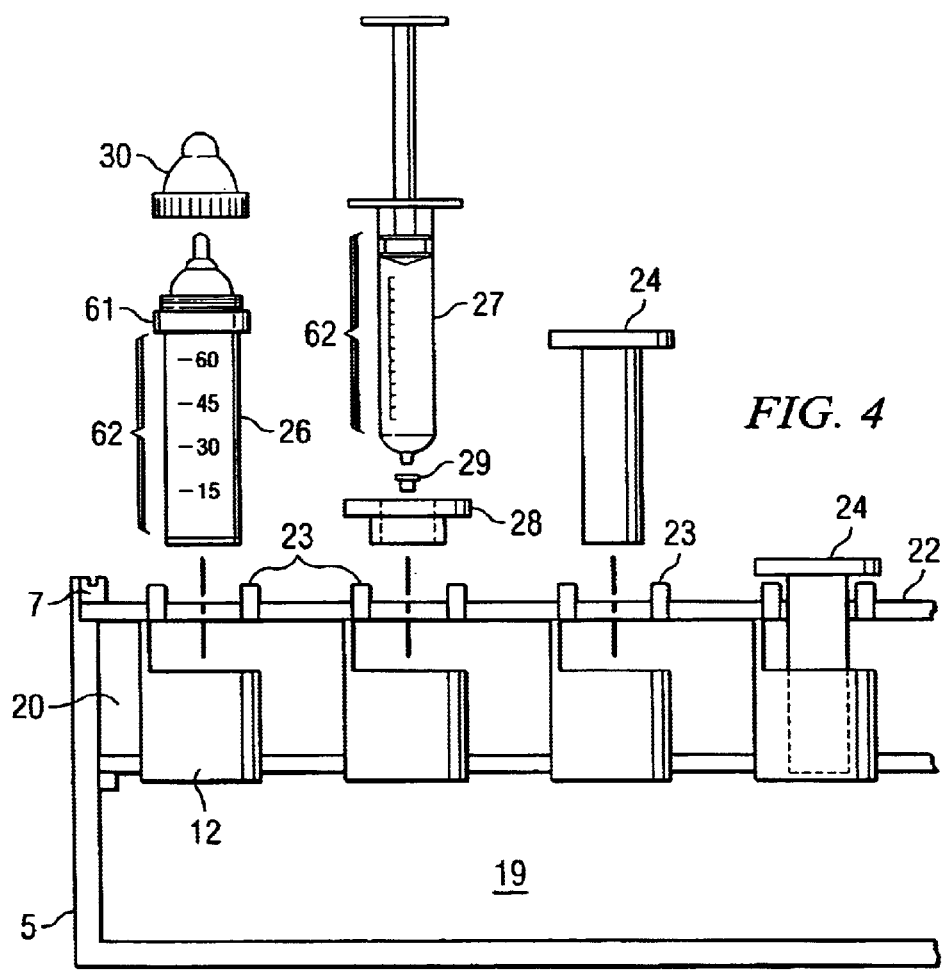
FIGS. 4 and 5 illustrate the insertion of a 60 cc Vol-feeder, a syringe, and an air restrictor plug into respective feeding receptacles of the infant feeding warmer of FIG. 1.
Figure 5:
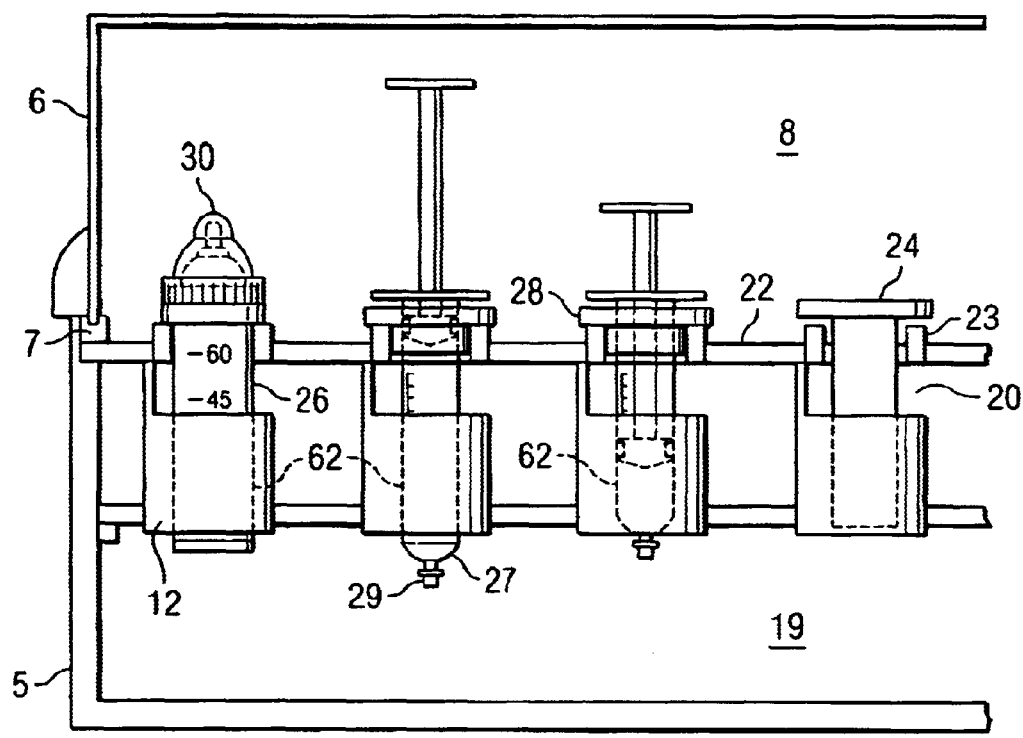

FIGS. 4 and 5 illustrate the insertion of various infant feedings into respective feeding receptacles 12 of infant feeding warmer 100. Any suitable infant feedings may be used with the present invention; however, in the embodiment illustrated in FIGS. 4 and 5, infant feedings include a 60 cc Vol-feeder 26 and a syringe 27, which may be any suitable syringe, such as a 60 cc syringe, a 35 cc syringe, or a 20 cc syringe. Infant feedings, such as 60 cc Vol-feeder 26 and syringe 27 may be formed from any suitable material, such as plastic or glass.

60 cc Vol-feeder 26 has a rim 61 around a top portion thereof that is able to rest on portal 23 when inserted into feeding receptacle 12. A nipple cover 30 may be coupled to 60 cc Vol-feeder 26 for sterilization purposes. Syringe 27 typically needs an adapter ring 28 so that it may be inserted into feeding receptacle 12. This is because the diameter of syringes 27 are smaller than that of 60 cc Vol-feeder 26. A syringe medicine cap 29 may be coupled to the end of syringe 27 before being inserted into adapter ring 28. Adapter ring 28 then rests on portal 23 to function to center syringe 27 within feeding receptacle 12.

Also illustrated in FIGS. 4 and 5 are air restricter plugs 24 inserted into feeding receptacles 12 that are not being used to heat infant feedings, such as 60 cc Vol-feeder 26 and syringe 27. As illustrated best in FIG. 5, main bodies 62 of infant feedings 26, 27 and air restricter plugs 24 are all essentially centered within feeding receptacles 12. This ensures that air flowing from lower chamber 19 into middle chamber 20 is evenly distributed into all feeding receptacles 12 to optimize the heating process by ensuring that a substantially equal amount of air flows through each feeding receptacle 12.

Figure 6:
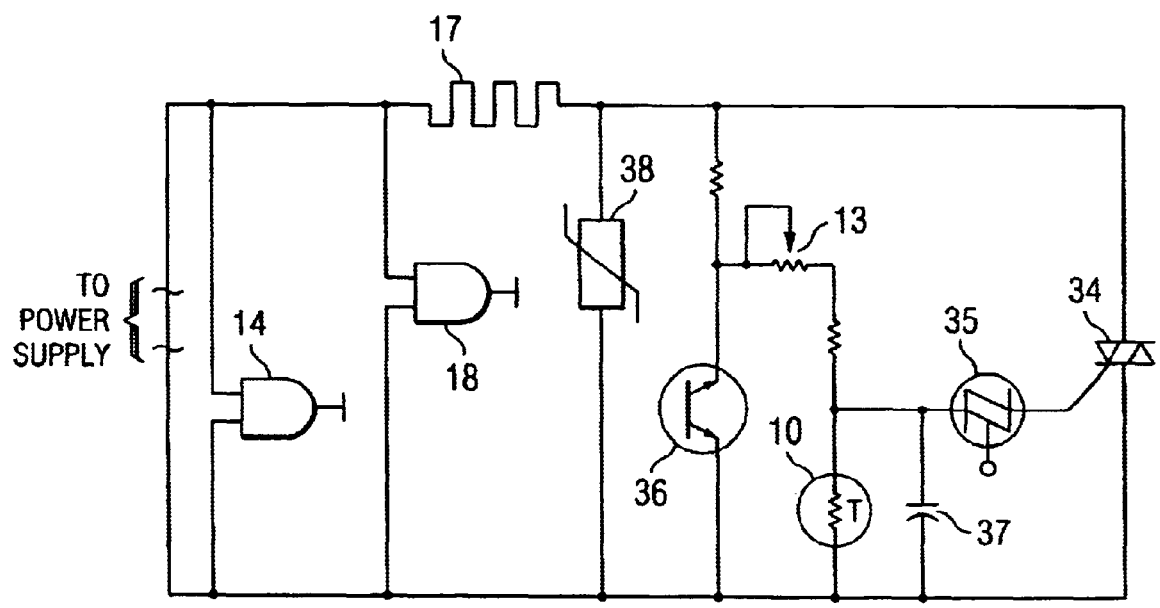
FIG. 6 is an electrical schematic of a mode of operation of the infant feeding warmer of FIG. 1 in accordance with one embodiment of the present invention.

FIG. 6 is an electrical schematic of portions of infant feeding warmer 100 in accordance with one embodiment of the present invention; however, other electrical systems may be used to control the flow of heated air within the teachings of the present invention. In one embodiment, the electrical power supply is of alternating current, supplying 120 volts at 60 hz. The circuit may control 6 kw of heating, with moderate gain, using a 25 amp Triac 34. Feedback is provided by the negative temperature coefficient thenmistor 35 with surface heat sensor probe 10 coupled to false feeding 11. Thermostat set point 13 is initially adjusted to the desired predetermined temperature. As thermistor 35 becomes heated by heating element 17, its resistance drops, phasing back the conduction angle of the triac 34 so that the voltage of heating element 17 is reduced. A diac 36 is used as a back-to-back zenor diode. Its negative resistance region is its E-I characteristics provide a degree of line voltage stabilization. As the input line voltage increases, the diac 36 trigger earlier in the cycle and, hence, the average charging voltage to the 0.1 microfarad capacitor 37 decreases. The resistance of the varistor 38 varies with the applied voltage. The circuit accommodates electrical motor 14, which may be a 115 volt, 60 hz, 3200 rpm, Class B motor, with attached barrel fan 15. Barrel fan 15 is used to circulate the heated air through lower chamber 19 and middle chamber 20 to warm infant feedings. Exhaust fan 28 is used to circulate ambient air to cool electric motor 14.

Although embodiments of the invention and some of their advantages are described in detail, a person skilled in the art could make various alterations, additions, and omissions without departing from the spirit and scope of the present invention as defined by the appended claims.

What is claimed is:

1. A system for warming infant feedings, comprising:
   a housing having a lower chamber, a middle chamber disposed above the lower chamber, an upper chamber disposed above the middle chamber, a fan housing adjacent the lower chamber, a motor housing adjacent the fan housing, and a cover disposed above the upper chamber;
   a plurality of feeding receptacles, including at least one false feeding receptacle, disposed within the middle chamber, the feeding receptacles and false feeding receptacle each having an open bottom exposed to the lower chamber and an open top exposed to the middle chamber;
   a plurality of portals associated with a partition separating the upper chamber from the middle chamber, each portal positioned above a respective feeding receptacle and adapted to position an infant feeding within the respective feeding receptacle;
   a false feeding disposed within the false feeding receptacle;
   a plurality of air restrictor plugs adapted to be inserted into the feeding receptacles, the air restrictor plugs having a smaller circumference than the inside circumference of the feeding receptacles;
   a surface heat sensor probe coupled to the false feeding, the surface heat sensor probe operable to detect a temperature of the false feeding; and
   a heating unit coupled to the heat sensor probe, the heating unit comprising:
      an electric motor disposed in the motor housing;
      a barrel fan disposed in the fan housing, the barrel fan coupled to, and driven by, the electric motor;
      a heating element disposed in the fan housing adjacent the lower chamber;
      a thermostat coupled to the heat sensor probe; and
      wherein the barrel fan is operable to circulate air through the fan housing, over the heating element, into the lower chamber, through the feeding receptacles and into to the middle chamber, and the thermostat is operable to control the energy output of the heating element to maintain the temperature of the false feeding at the predetermined temperature.

2. A system for warming feedings, comprising:
   a housing having a lower chamber, a middle chamber disposed above the lower chamber, an upper chamber disposed above the middle chamber, a fan housing adjacent the lower chamber, a motor housing adjacent the fan housing, and a cover disposed above the upper chamber;
   a plurality of feeding receptacles, including at least one false feeding receptacle, disposed within the middle chamber, the feeding receptacles and false feeding receptacle each having an open bottom exposed to the lower chamber and an open top exposed to the middle chamber;
   a plurality of portals associated with a partition separating the upper chamber from the middle chamber, each portal positioned above a respective feeding receptacle and adapted to position an infant feeding within the respective feeding receptacle;
   a false feeding coupled to an underside of the partition and disposed within the false feeding receptacle;
   a surface heat sensor probe coupled to the false feeding, the surface heat sensor probe operable to detect a temperature of the false feeding; and
   a heating unit coupled to the heat sensor probe, the heating unit operable to approximately maintain the temperature of the false feeding at a predetermined temperature.

3. The system of claim 2, wherein the heating unit comprises:
   an electric motor disposed in the motor housing;
   a fan disposed in the fan housing, the fan coupled to, and driven by, the electric motor;
   a heating element disposed in the fan housing adjacent the lower chamber;
   a thermostat coupled to the heat sensor probe, the thermostat operable to control the energy output of the heating element to maintain the temperature of the false feeding at the predetermined temperature; and
   wherein the fan is operable to circulate air from the middle chamber into the fan housing, over the heating element, into the lower chamber, through the feeding receptacles and back to the middle chamber.

4. The system of claim 3, wherein the fan is a barrel fan.

5. The system of claim 3, wherein the thermostat is further operable to control the energy output of the heating element to ensure that the temperature of the false feeding does not rise above the predetermined temperature.

6. The system of claim 2, further comprising a plurality of air restrictor plugs adapted to be inserted into the feeding receptacles, the air restrictor plugs having a smaller perimeter than the inside perimeter of the feeding receptacles.

7. The system of claim 2, further comprising an adapter ring adapted to center a syringe in a respective feeding receptacle when coupled to a respective portal associated with the respective feeding receptacle.

8. The system of claim 2, wherein the fan housing includes an angled surface proximate a location where the fan housing couples to the lower chamber, the angled surface adapted to direct air flowing through the fan housing downward toward a bottom portion of the lower chamber as the air enters the lower chamber.

9. The system of claim 2, further comprising an exhaust fan adjacent the electric motor to remove heat generated by the electric motor from the heating unit.

10. The system of claim 2, wherein the infant feedings are of similar diameter.

11. The system of claim 2, wherein the infant feedings are selected from the group consisting of a 60 cc Vol.-feeder, a 60 cc syringe, a 35 cc syringe, and a 20 cc syringe.

12. The system of claim 2, further comprising a gasket disposed between the housing and the cover.

13. A method for warming infant feedings, comprising:
   providing a housing having a lower chamber, a middle chamber disposed above the lower chamber, an upper chamber disposed above the middle chamber, a fan housing adjacent the lower chamber, a motor housing adjacent the fan housing, and a cover disposed above the upper chamber;
   disposing a plurality of feeding receptacles, including at least one false feeding receptacle, within the middle chamber, the feeding receptacles and false feeding receptacle each having an open bottom exposed to the lower chamber and an open top exposed to the middle chamber;
   coupling a plurality of portals to a partition separating the upper chamber from the middle chamber;

positioning each portal above a respective feeding receptacle;

coupling a false feeding to an underside of the partition such that the false feeding is disposed within the false feeding receptacle;

coupling a surface heat sensor probe to the false feeding, the surface heat sensor probe operable to detect a temperature of the false feeding;

coupling a heating unit to the heat sensor probe;

heating the false feeding to a predetermined temperature with the heating unit;

placing one or more infant feedings within one or more respective feeding receptacles; and maintaining a temperature of the false feeding at the predetermined temperature.

14. The method of claim 13, wherein heating the false feeding to the predetermined temperature with the heating unit comprises:

generating an air flow with a barrel fan disposed within the fan housing;

directing the air flow over a heating element disposed within the fan housing; and circulating the air flow from the fan housing into the lower chamber, then into the middle chamber via the feeding receptacles, and back to the fan housing.

15. The method of claim 14, wherein maintaining the temperature of the false feeding at the predetermined temperature further comprises controlling an energy output of the heating element to ensure that the temperature of the false feeding does not rise above the predetermined temperature.

16. The method of claim 14, further comprising directing the air flow flowing through the fan housing downward toward a bottom portion of the lower chamber as the air enters the lower chamber with an angled surface proximate a location where the fan housing couples to the lower chamber.

17. The method of claim 13, further comprising inserting a plurality of air restrictor plugs into the feeding receptacles that are not occupied by infant feedings, the air restrictor plugs having a smaller perimeter than the inside perimeter of the feeding receptacles.

18. The method of claim 13, wherein at least one of the one or more infant feedings comprises a syringe, the method further comprising centering the syringe in a respective feeding receptacle with an adapter ring.

19. The method of claim 13, further comprising disposing a gasket between the housing and the cover.

20. The method of claim 13, wherein the one or more infant feedings are of similar diameter.

21. A system for warming infant feedings, comprising:

a housing having a lower chamber, a middle chamber, and an upper chamber;

a plurality of apertures associated with a first partition separating the lower chamber from the middle chamber;

a plurality of portals associated with a second partition separating the upper chamber from the middle chamber, each portal positioned above a respective aperture and adapted to position an infant feeding over the respective aperture;

a false feeding coupled to an underside of the second partition and disposed above a respective aperture;

a surface heat sensor probe coupled to the false feeding, the surface heat sensor probe operable to detect a temperature of the false feeding; and a heating unit coupled to the heat sensor probe, the heating unit including a fan operable to continuously circulate air through the lower chamber and into the middle chamber, the heating unit further including a thermostat and a heating element, the thermostat operable to control an energy output of the heating element to heat the continuously circulated air and, in conjunction with the surface heat sensor probe, to maintain the temperature of false feeding at a predetermined temperature.

22. The system of claim 21, wherein the thermostat is further operable to ensure that the temperature of the false feeding does not rise above the predetermined temperature.

23. The system of claim 21, further comprising a plurality of air restrictor plugs adapted to be inserted into the portals.

24. The system of claim 21, further comprising an adapter ring adapted to center an infant feeding in a respective portal.

25. The system of claim 21, further comprising an angled surface proximate a location where the circulated air is just about to enter the lower chamber, the angled surface adapted to direct the circulated air downward toward a bottom portion of the lower chamber as the air enters the lower chamber.

26. The system of claim 21, further comprising a plurality of feeding receptacles disposed between the portals and the apertures.

27. The system of claim 21, wherein the housing includes a cover adapted to expose the upper chamber so that a user can position one or more infant feedings in respective portals.

28. A method for warming infant feedings, comprising:

circulating air through a fan housing, a lower chamber, and a middle chamber;

disposing a false feeding within a false feeding receptacle associated with the middle chamber;

heating the false feeding to a predetermined temperature;

disposing one or more infant feedings having a temperature less than the predetermined temperature within one or more respective feeding receptacles associated with the middle chamber;

detecting a temperature of the false feeding; and maintaining the temperature of the false feeding at the predetermined temperature.

29. The method of claim 28, wherein maintaining the temperature of the false feeding at the predetermined temperature further comprises controlling an energy output of a heating element to ensure that the temperature of the false feeding does not rise above the predetermined temperature.

30. The method of claim 28, further comprising disposing a plurality of air restrictor plugs into the feeding receptacles that are not occupied by infant feedings, the air restrictor plugs having a smaller perimeter than the inside perimeter of the feeding receptacles.

* * * * *